POLYMORPHIC PHASE STABILITY OF PLASTIC SHORTENING COMPOSITIONS (q)-(w) CONTAINING VARIOUS PROPORTIONS OF RAPESEED OIL AND COTTONSEED STEARINE HARDSTOCKS.

United States Patent Office 3,597,230
Patented Aug. 3, 1971

3,597,230
PLASTIC SHORTENING HAVING A HIGHLY STABLE BETA-PRIME CRYSTALLINE PHASE
Edward E. Colby, Cincinnati, and Cornelis H. Japikse, Springfield Township, Hamilton County, Ohio, assignors to The Procter & Gamble Company, Cincinnati, Ohio
Filed Aug. 19, 1968, Ser. No. 753,437
Int. Cl. A23d 5/00
U.S. Cl. 99—122                                7 Claims

ABSTRACT OF THE DISCLOSURE

A hardstock composition comprising two components combined in certain proportions provides improved beta-prime-phase stability in plastic shortening. The hardstock components are a beta-prime-tending $C_{14-26}$ hardstock containing at least a minimum amount of $C_{20-22}$ fatty acids and a beta-prime-tending $C_{14-18}$ hardstock containing at least a minimum amount of $C_{16-18}$ fatty acids.

BACKGROUND OF THE INVENTION

The field of this invention is edible plastic shortening. More specifically, the invention relates to plastic shortenings containing a combination of hardstocks which co-act to provide a highly stable, beta-prime crystalline phase.

Conventional plastic shortenings are composed essentially of solid fats or mixtures of solid fats, and liquid oils which have been processed by various techniques which make the product plastic and workable at room temperature. Thus, it is well known in the art that certain kinds of fat crystals, most notably the beta-prime crystals, have the capacity to form a rigidly interlocking structure when suspended in a liquid component if the solids are present in sufficient amounts.

It is, therefore, important that the solid glycerides of a shortening be of the proper crystal type. A shortening that crystallizes in the beta-phase form often tends to be waxy or grainy. These characteristics are desirable in some instances and shortenings have been formulated to have a beta-phase crystalline structure. However, to provide the most acceptable commercial plastic shortenings which have good creaming ability and retain their appearance, volume and performance characteristics under adverse storage conditions, it is necessary that the solid glycerides crystallize and remain in the beta-prime crystalline form.

In general, the method of attaining the beta-prime form desired for plastic shortenings is to add a suitable beta-prime-tending highly hydrogenated or saturated fat known as hardstock. The hardstock itself must of course be a beta-prime-tending type. In this category are such fats as hydrogenated tallow, cottonseed oil and cottonseed stearine, palm oil, certain of the fish oils and rapeseed oil. Since the beta crystalline phase of triglycerides is known to generally be more thermodynamically stable than the beta-prime-phase, even highly "beta-prime-tending" hardstocks tend to undergo transformation into the beta-phase, especially under certain storage conditions. Thus it is highly desirable in the formulation of a beta-prime plastic shortening to provide the highest level possible of beta-prime-phase stability.

The following references provide further pertinent background in the art of the invention, i.e., polymorphic phase structure of edible fats.

Chemical Reviews, 62, #5, 433–56 (1962);
J. Am. Chem. Soc., 72, 4519–21 (1950);
J. Am. Oil Chem. Soc., 27, 276 (1950); and
U.S. Patents 3,129,102, 3,265,507, and 2,521,242.

SUMMARY OF THE INVENTION

In accordance with the present invention, it has been discovered that certain combinations of beta-prime-tending hardstocks co-act in a novel manner to provide a plastic shortening having improved polymorphic stability of the beta-prime crystalline phase. One of the two hardstocks is a $C_{14-26}$ beta-prime-phase-tending hardstock containing at least 20% $C_{20-22}$ fatty acids. The other hardstock is a $C_{14-18}$ beta-prime-phase-tending hardstock containing at least 20% $C_{16-18}$ fatty acids. Significant improvements are realized when the two hardstocks are used in amounts so that the total hardstock comprises 5%–50% of the $C_{14-26}$ hardstock and 50%–95% of $C_{14-18}$ hardstock. More specifically, the present invention provides a triglyceride plastic shortening having improved polymorphic stability of the beta-prime crystalline phase, which comprises:

(A) from about 85% to about 96% glyceride base stock having an iodine value greater than about 50, and
(B) from about 4% to about 15% triglyceride hardstock having an iodine value less than about 15, said hardstock comprising a mixture of (1) $C_{14-26}$ beta-prime-phase-tending hardstock containing at least 20% $C_{20-22}$ fatty acids, and (2) $C_{14-18}$ beta-prime-phase-tending hardstock containing at least 20% $C_{16-18}$ fatty acids, the total triglyceride hardstock comprising from about 5% to about 50% of hardstock (1) and from about 50% to about 95% of hardstock (2).

DESCRIPTION OF THE PREFERRED EMBODIMENTS

Figure 1:
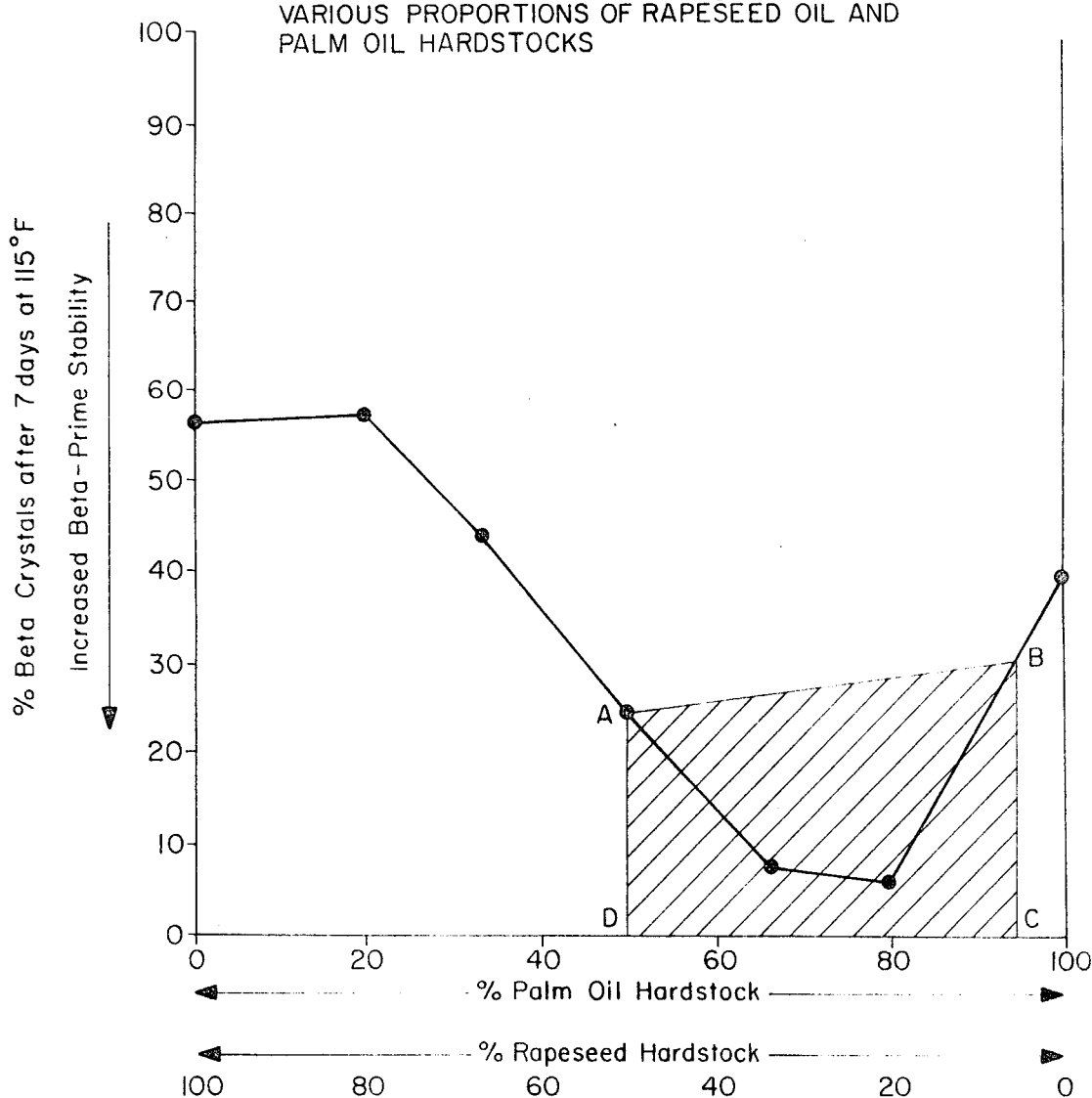
FIG. 1 is a graph showing the beta-prime-phase stability of a preferred combination of the invention wherein the $C_{14-26}$ hardstock is hydrogenated rapeseed oil having an iodine value of about 8 and the $C_{14-18}$ hardstock is hydrogenated palm oil having an iodine value of about 3.
Figure 2:
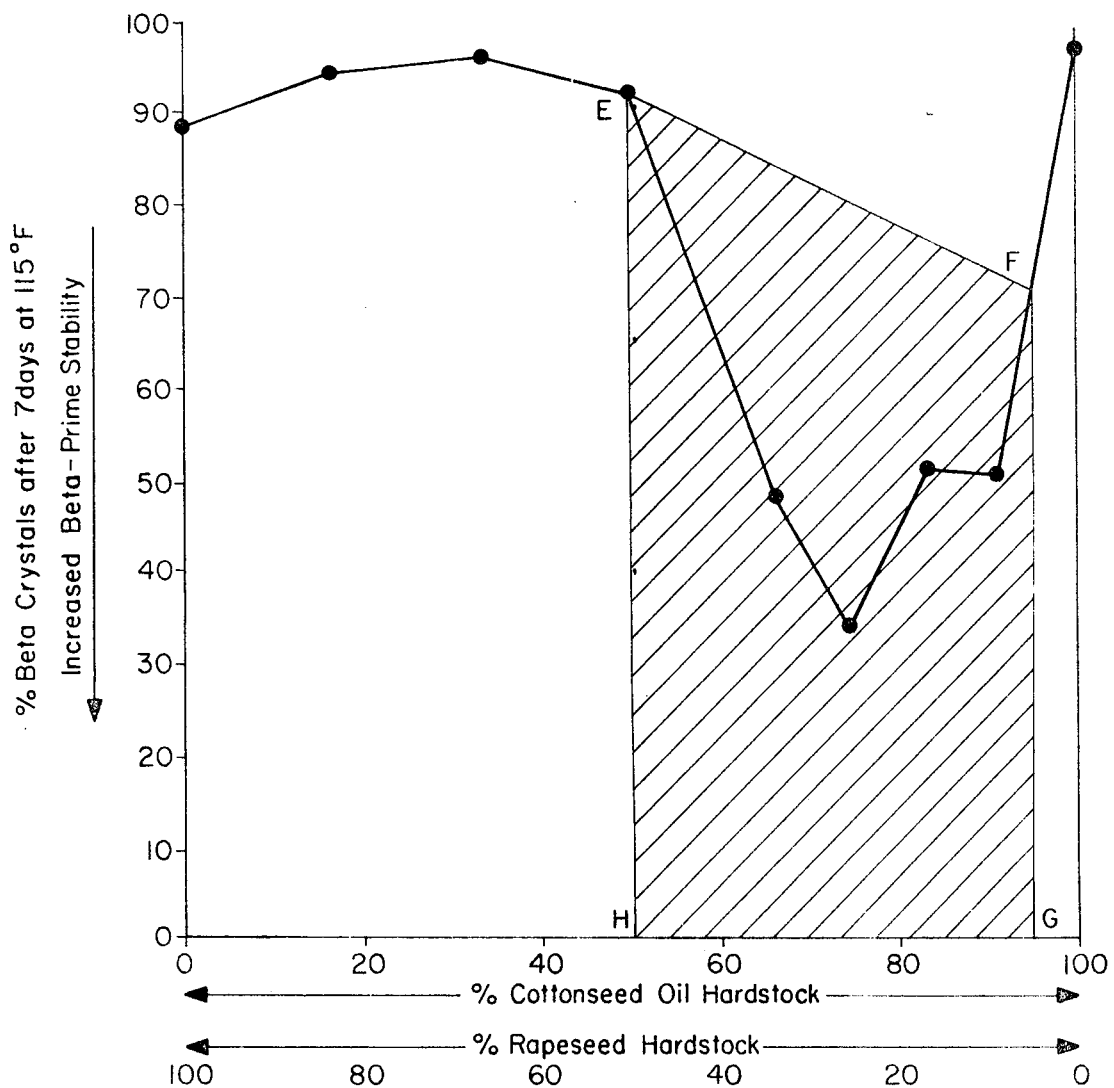
FIGS. 2 and 3 are similar to FIG. 1 except that the $C_{14-18}$ hardstocks are respectively hydrogenated cottonseed oil having an iodine value of about 8 and cottonseed stearine having an iodine value of about 8.
Figure 3:
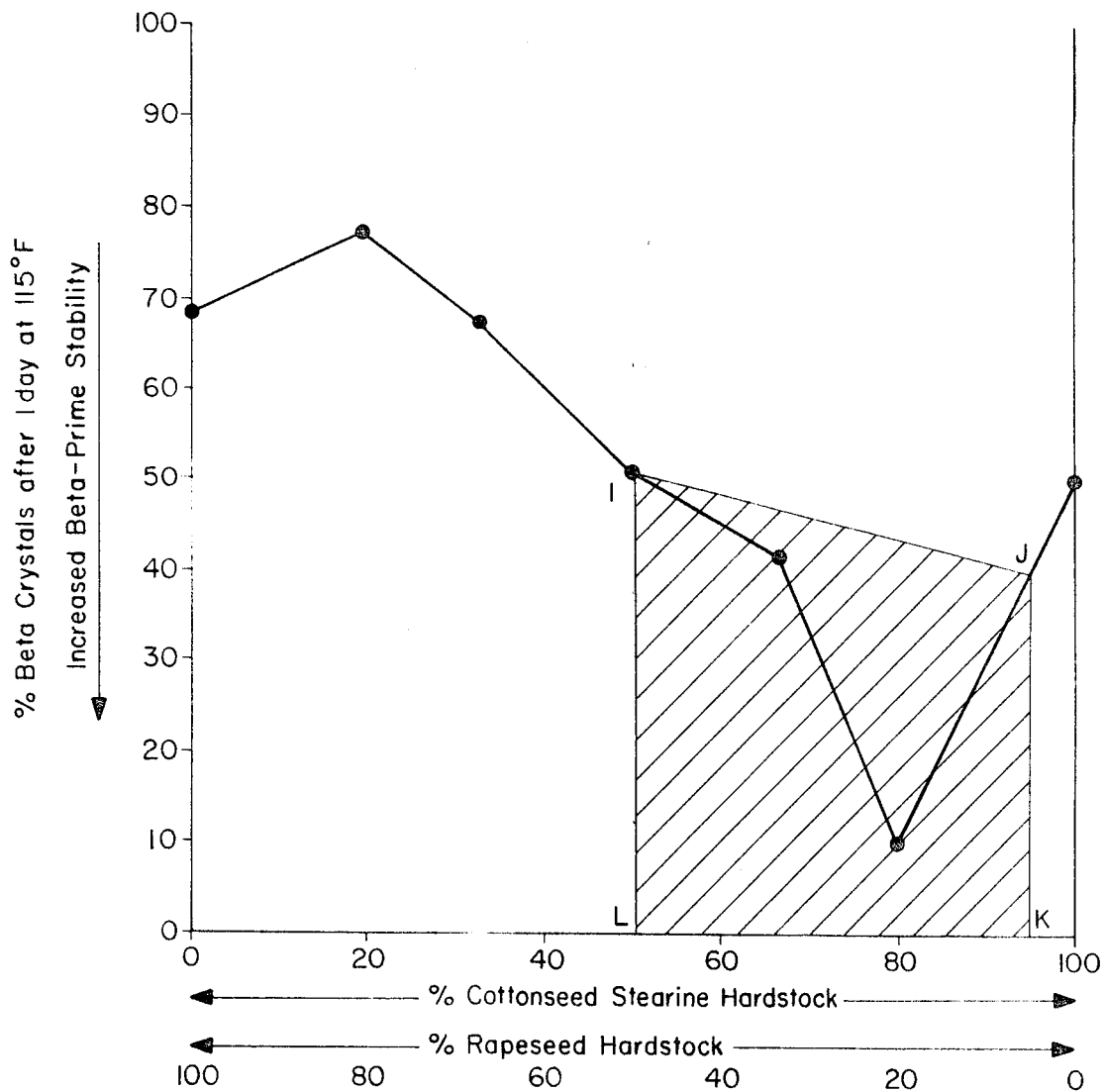

As used herein, the term "plastic" shortening defines a solid, non-fluid, and non-pourable shortening at room temperature (70° F. to 100° F.). Said shortening must have a yield point high enough to prevent product flow at room temperature, that is, it must be sufficiently solid to prevent product deformation under its own weight in ordinary commercial unit quantities.

Also, as used herein, the term "beta-prime-phase-tending" defines an overall tendency of certain triglyceride solids to crystallize in the beta-prime phase. This does not mean, however, that under proper conditions triglyceride solids cannot be transformed from a beta-prime-phase to a beta-phase. The types of polymorphic crystalline structures of fats can be identified by their X-ray diffraction patterns and are described in U.S. Pats. 2,521,-241–2, granted to Paul J. Mitchell, Jr., Sept. 5, 1950. The beta-prime plastic shortenings of the present invention have a dominant amount (e.g., greater than 50%) of their solid crystals in the beta-prime phase, and preferably have at least 80% of their crystals in the beta-prime phase, particularly when stored under normal conditions, e.g., 70°–95° F.

The plastic shortenings of the present invention comprise from about 85% to about 96%, preferably from about 90% to about 95% glyceride base stock having an iodine value greater than about 50, preferably less than about 150 and most preferably from about 70 to about 130. The base stock can be an edible normally liquid glyceride oil or a partially hydrogenated glyceride oil or fat having the specified iodine value. Suitable base stock glycerides can be derived from animal, vegetable, or marine sources, including naturally occurring triglyceride oils and fats such as cottonseed oil, soybean oil, peanut oil, coconut oil, palm kernel oil, olive oil, palm oil, corn oil, rapeseed oil, sunflower seed oil, sesame oil, safflower oil, sardine oil, lard, tallow and the like. Very highly unsaturated oils may require some hydrogenation to improve their resistance to oxidative deterioration. Hydrogenation to reduce the iodine value of these highly unsaturated oils to less than about 130 generally is sufficient for purposes of this invention. A preferred base stock is selected from hydrogenated soybean oil, cottonseed oil, and mixtures thereof, having an iodine value of from about 70 to about 130, preferably from about 90 to about 110.

Other suitable base stock glycerides having iodine values greater than about 50 for use in this invention can be derived from natural or synthetic fats and oils containing in the glyceride molecule long chain acyl radicals having from about 12 to about 24 carbon atoms such as lauroyl, lauroleoyl, myristoyl, myristoleoyl, palmitoyl, palmitoleoyl, stearoyl, oleoyl, linoleoyl, linolenoyl, elaidoyl, arachidoyl, gadoleoyl, arachidonoyl, behenoyl, erucoyl, brassidoyl, clupadonoyl, lignoceroyl, and/or selacholeoyl. A portion of the base stock glyceride also can contain in the molecule one or two short chain acyl groups having from 2 to about 10 carbon atoms such as acetyl, propanoyl, butanoyl, pentanoyl, hexanoyl and the like. Suitable base stock also can be derived from randomly and low temperature interesterified fatty triglyceride containing oils and fats such as interesterified cottonseed oil and lard.

Suitable partial hydrogenation of the liquid soybean and/or cottonseed oil to form the preferred base stock of this invention can be carried out by conventional methods and usually consists of a batch process whereby the oil is contacted with hydrogen in the presence of nickel catalyst.

The iodine value (I.V.) of an oil or fat indicates the number of grams of iodine equivalent to the halogen absorbed by a 100 gram sample. In general, the lower the iodine value of a given fat or oil, the greater will be its content of solids at a given temperature. That is, as the triglyceride molecules become more saturated by the addition of hydrogen (or the double bond content decreases), the consistency of the fat or oil becomes more solid. The iodine value can be readily determined by the well-known Wijs method.

The plastic shortenings of the present invention also comprise from about 4% to about 16%, preferably from about 5% to about 10%, triglyceride hardstock having an iodine value of less than about 15, preferably from about 2 to about 10, and most preferably about 8.

The hardstock comprises a mixture of two components.

Hardstock component (1) is a $C_{14-26}$ beta-prime-phase-tending hardstock containing at least 20% $CC_{20-22}$ fatty acids, and hardstock component (2) is a $C_{14-18}$ beta-prime-phase-tending hardstock containing at least 20% $C_{16-18}$ fatty acids. Hardstock component (1) amounts to from about 5% to about 50%, preferably from about 10% to about 30%, and most preferably from about 12% to about 25% of the total hardstock composition and hardstock component (2) amounts to from about 50% to about 95%, preferably 70% to about 90%, and most preferably 75% to about 88% of the total hardstock composition.

Hardstock component (1) preferably has an iodine value of less than about 15 and most preferably has an iodine value of from about 2 to about 10. A highly preferred iodine value for hardstock component (1) is about 8.

Hardstock component (1) must contain at least 20% $C_{20-22}$ fatty acids. Preferably, hardstock component (1) contains at least 40% $C_{20-22}$ fatty acids. Most preferably, this hardstock contains from about 40% to about 60% $C_{20-22}$ fatty acids, the balance being $C_{16-18}$ fatty acids. Suitable hardstock meeting the requirements for hardstock component (1) can be prepared through esterification of fatty acids (of from about 14 to about 26 carbon atoms at least 20% of which contain 20 or 22 carbon atoms) with glycerol. Alternatively, this hardstock component can be derived from naturally occurring fats and oils which meet the specified fatty acid requirement and exhibit beta-prime-phase-tending properties such as rapeseed oil, crambe oil, mustard seed oil, wallflower seed oil, marine oils, nasturtium seed oil, and similar fats and oils.

A highly preferred $C_{14-26}$ beta-prime-phase-tending hardstock for use as hardstock component (1) is substantially completely hydrogenated rapeseed oil having an iodine value of about 8. This material tends to crystallize in the beta-prime-phase and is known to hinder the formation of beta-phase crystals in a conventional plastic shortening. Unexpectedly however, it has been found that rapeseed oil hardstock and the other hardstocks meeting the requirements set forth herein for hardstock component (1) when used in the specified proportions with the beta-prime-phase-tending hardstocks set forth herein for component (2) provide beta-prime-phase stability far superior to that obtainable with either hardstock when used alone. Thus, the hardstock compositions of the invention co-act in a synergistic manner to provide improved beta-prime-phase stability.

Hardstock component (2) preferably has an iodine value of less than about 15, and most preferably has an iodine value of from about 2 to about 10. A highly preferred iodine value for hardstock component (2) is about 8.

The $C_{14-18}$ beta-prime-phase-tending hardstock component (2) must contain at least 20% $C_{16-18}$ fatty acids. This hardstock component can be prepared through esterification of fatty acids (of from about 14 to about 18 carbon atoms at least 20% of which contain 16 or 18 carbon atoms) with glycerol. Alternatively, this hardstock component can be derived from naturally occurring fats and oils which meet the specified fatty acid requirement and exhibit beta-prime crystalline phase-tending properties such as palm oil, cottonseed oil, cottonseed stearine, tallow, and similar fats and oils. Hardstock component (2) must contain at least 20% $C_{16-18}$ fatty acids, and preferably contains at least 20% $C_{16}$ fatty acid. A preferred $C_{14-18}$ hardstock component (2) is selected from the group consisting of palm oil hardstock, cottonseed oil hardstock, cottonseed stearine hardstock, and mixtures thereof. Cottonseed stearine is the triglyceride precipitated during winterization of cottonseed oil and is a standard article of commerce. See, for example, U.S. Pats. 2,205,-381 and 3,048,491 for a detailed description of this material. Cottonseed stearine can be substantially completely hydrogenated to form cottonseed stearine hardstock.

For use in food products, it is preferable to incorporate in the shortenings one or more of the conventional emulsifiers. For example, the ordinary mono- and diglycerides of higher fatty acids such as mono- and distearin can be used as ingredients of the shortening of this invention for their well-known emulsifying purposes. It is preferable to include in the shortenings from about 2% to about 12%, by weight, of mono- and diglycerides of hydrogenated soybean oil or mixtures of hydrogenated soybean and cottonseed oils.

Various other additives can be used in the shortenings of this invention provided that they are edible and aesthetically desirable and do not have a detrimental effect upon the melting and crystallization characteristics of the shortening. For example, certain common shortening additives such as the higher fatty acid esters of sucrose, sorbitol, sorbitan, polyoxyethylene, and polyoxyethylene sorbitan; lactic and/or citric acid esters of mono- and/or diglycerides, or of other higher fatty acid-containing polyol partial esters; propylene glycol monostearate and the like esters; and antioxidants such as butylated hydroxytoluene, butylated hydroxyanisole, citric acid, and monostearate are compatible with the beta-prime-phase plastic shortenings of this invention and can be incorporated therein if desired.

The plastic shortenings of this invention can be prepared by various conventional means well known in the art for processing plastic shortenings. In general, conventional methods of preparing plastic shortenings involve the steps of heating the shortening to a temperature (e.g., 100°–200° F.) above the melting point of its solid components to form a melt, injecting edible gas (e.g., 10–25 volume percent) into the melt, passing the melted shortening through a scraped wall heat exchanger (e.g., to 50°–70° F.) in a unit such as a "Votator," to form a supercooled mixture containing small crystals, continuing crystallization into the plastic state while mildly agitating in one or more stages, and then tempering at a constant temperature (e.g., 80°–90° F.) while at rest for several hours (e.g., 12–60 hours).

Examples I–III

Combinations of rapeseed oil hardstock and palm oil hardstock.—Plastic shortening compositions $(a)$–$(g)$ comprising 94% base stock having an iodine value of about 98 (consisting of about 90% soybean oil and 10% cottonseed oil) and 6% hardstock having an iodine value of 8 and consisting of rapeseed oil hardstock (hydrogenated rapeseed oil having an iodine value of about 8) and/or palm oil hardstock (hydrogenated palm oil having an iodine value of about 3) as specified in Table 1 were prepared and subjected to a rapid polymorphic stability test as follows: The shortening compositions were melted to a liquid at 135° F. and rapidly chilled to a solid at 50° F. in about 15 seconds by placement in a bath maintained at −100° F. The shortening compositions were stored at 115° F. (this temperature approximates the complete melting point of the compositions and is known to accelerate beta-phase transformation) for seven days and then analyzed for beta crystals in the crystalline phase, as recorded in Table 1.

TABLE 1

| | Percent | | |
|---|---|---|---|
| | Rapeseed hardstock | Palm oil hardstock | Beta crystals[1] |
| Composition: | | | |
| (a) | 100 | 0 | 56.1 |
| (b) | 80 | 20 | 57.7 |
| (c) | 66⅔ | 33⅓ | 43.8 |
| (d) (Example I) | 50 | 50 | 24.5 |
| (e) (Example II) | 33⅓ | 66⅔ | 8.1 |
| (f) (Example III) | 20 | 80 | 6.1 |
| (g) | 0 | 100 | 41.2 |

[1] Balance: beta prime crystals.

The data of Table 1 are plotted in FIG. I wherein it is shown that compositions comprising 5%–50% rapeseed hardstock and 50%–95% palm oil hardstock (Examples I–III) provide a synergistic improvement in beta-prime-phase stability as indicated by the shaded area ABCD of FIG. I.

Examples IV–VIII

Combinations of rapeseed oil hardstock and cottonseed oil hardstock.—Plastic shortening compositions $(h)$–$(p)$ comprising 94% base stock having an iodine value of about 98 (consisting of about 90% soybean oil and 10% cottonseed oil) and 6% hardstock having an iodine value of 8 and consisting of rapeseed oil hardstock (hydrogenated rapeseed oil having an iodine value of about 8) and/or cottonseed oil hardstock (hydrogenated cottonseed oil having an iodine value of about 8) as specified in Table 2 were prepared and subjected to the rapid polymorphic stability test described for Examples I–III. Data for the analysis of the crystalline phase of these compositions are shown in Table 2.

TABLE 2

| | Percent | | |
|---|---|---|---|
| | Rapeseed hardstock | Cottonseed oil hardstock | Beta crystals[1] |
| Composition: | | | |
| (h) | 100 | 0 | 88.5 |
| (i) | 83⅓ | 16⅔ | 94.3 |
| (j) | 66⅔ | 33⅓ | 96.3 |
| (k) (Example IV) | 50 | 50 | 92.9 |
| (l) (Example V) | 33⅓ | 66⅔ | 48.9 |
| (m) (Example VI) | 25 | 75 | 34.2 |
| (n) (Example VII) | 16⅔ | 83⅓ | 52.4 |
| (o) (Example VIII) | 8⅓ | 91⅔ | 51.9 |
| (p) | 0 | 100 | 97.1 |

[1] Balance: beta prime crystals.

The data of Table 2 are plotted in FIG. II wherein it is shown that compositions comprising 5%–50% rapeseed hardstock and 50%–95% cottonseed oil hardstock (Examples IV–VIII) provide a synergistic improvement in beta-prime-phase stability as indicated by the shaded area EFGH of FIG. II.

In Example V, substantially equivalent results are obtained in terms of beta-prime-phase stability when one-half of the cottonseed oil hardstock is replaced by palm oil hardstock.

Examples IX–XI

Combination of rapeseed oil hardstock and cottonseed stearine hardstock.—Plastic shortening compositions $(g)$–$(w)$ comprising 94% base stock having an iodine value of about 98 (consisting of about 90% soybean oil and 10% cottonseed oil) and 6% hardstock having an iodine value of 8 and consisting of rapeseed oil hardstock (hydrogenated rapeseed oil having an iodine value of about 8) and/or cottonseed stearine hardstock (hydrogenated cottonseed stearine having an iodine value of about 8) as specified in Table 3 were prepared and subjected to a rapid polymeric stability test described for Examples I–III except that the storage period was one day. Data for the analysis of the crystal phase of these compositions are shown in Table 3.

TABLE 3

| | Percent | | |
|---|---|---|---|
| | Rapeseed hardstock | Cottonseed stearine hardstock | Beta crystals[1] |
| Composition: | | | |
| (q) | 100 | 0 | 68.7 |
| (r) | 80 | 20 | 77.6 |
| (s) | 66⅔ | 33⅓ | 67.7 |
| (t) (Example IX) | 50 | 50 | 51.7 |
| (u) (Example X) | 33⅓ | 66⅔ | 42.3 |
| (v) (Example XI) | 20 | 80 | 10.1 |
| (w) | 0 | 100 | 50.8 |

[1] Balance: beta prime crystals.

The data of Table 3 are plotted in FIG. III wherein it is shown that combinations of 5%–50% rapeseed hardstock and 50%–95% cottonseed stearine hardstock (Examples IX–XI) exhibit a synergistic improvement in beta-prime-phase stability as indicated by the shaded area IJKL of FIG. III.

Example XII

A plastic shortening composition comprising 90% soybean oil base stock having an iodine value of about 107, 5% of a 40:20 mixture of mono-, di-, and triglycerides of soybean oil having an iodine value of about 50, and 5% hardstock having an iodine value of 10 consisting of 16% tribehenin and 66% tripalmitin is prepared as follows: the shortening components are melted at 140° F. and injected with 12 volume percent nitrogen, rapidly chilled in a Votator scraped wall heat exchanger to 50° F., passed to a picker box mixture to 65° F., and tempered at 85° F. for 48 hours. The plastic shortening product has a very stable beta-prime crystalline phase.

All percents, proportions and ratios specified herein are by weight unless indicated otherwise.

What is claimed is:

1. Triglyceride plastic shortening having improved polymorphic stability of the beta-prime crystalline phase, which comprises:
   (A) from about 85% to about 96% glyceride base stock having an iodine value greater than about 50, and
   (B) from about 4% to about 15% triglyceride hardstock having an iodine value less than about 15, said hardstock comprising a mixture of (1) $C_{14-26}$ beta-prime-phase-tending hardstock containing at least 20% $C_{20-22}$ fatty acids, and (2) $C_{14-18}$ beta-prime-phase-tending hardstock containing at least 20% $C_{16-18}$ fatty acids, the total triglyceride hardstock comprising from about 5% to about 50% of hardstock (1) and from about 50% to about 95% of hardstock (2).

2. The shortening of claim 1 wherein the base stock is selected from the group consisting of hydrogenated soybean oil, cottonseed oil, and mixtures thereof.

3. The shortening of claim 2 wherein the base stock has an iodine value of from about 70 to about 130.

4. The shortening of claim 3 wherein hardstock component (1) has an iodine value of from about 2 to about 10 and contains at least 40% $C_{20-22}$ fatty acids; and hardstock component (2) has an iodine value of from about 2 to about 10.

5. The shortening of claim 4 wherein hardstock component (1) contains from about 40% to about 60% $C_{20-22}$ fatty acids, the balance being $C_{16-18}$ fatty acids and hardstock component (2) contains at least 20% $C_{16}$ fatty acid.

6. The shortening of claim 5 wherein the amount of hardstock component (1) is from about 10% to about 30% and is substantially completely hydrogenated rapeseed oil, and the amount of hardstock component (2) is from about 70% to about 90% and is selected from the group consisting of palm oil hardstock, cottonseed oil hardstock, cottonseed stearine hardstock, and mixtures thereof.

7. The shortening of claim 6 which contains from about 90% to about 95% base stock and from about 5% to about 10% hardstock.

References Cited
UNITED STATES PATENTS

| | | | |
|---|---|---|---|
| 2,855,311 | 10/1958 | Nelson | 99—122 |
| 3,253,927 | 5/1966 | Going | 99—118 |
| 3,360,376 | 12/1967 | Dobson | 99—118 |

JOSEPH M. GOLIAN, Primary Examiner

U.S. Cl. X.R.

99—118, 123